May 12, 1970  M. W. KAPKE  3,511,076
FEEDING DEVICE
Filed Dec. 18, 1967  3 Sheets-Sheet 1
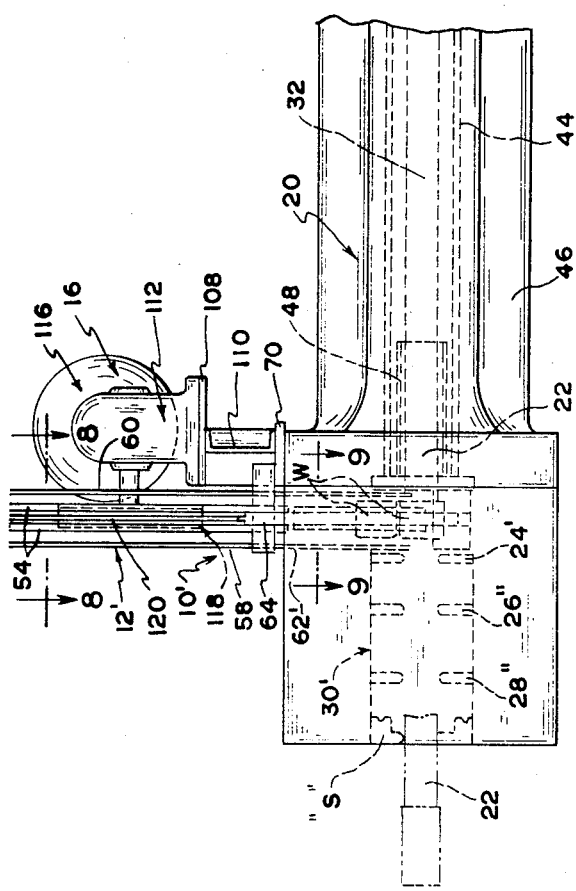
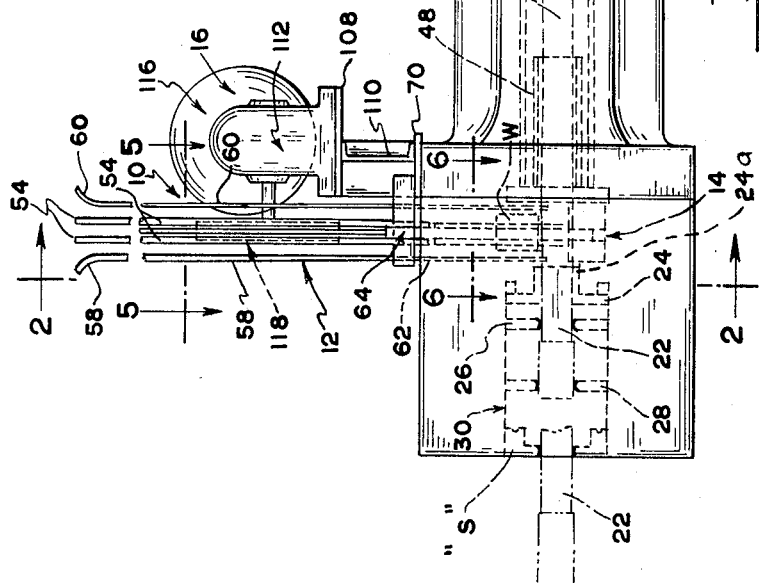
INVENTOR.
MILTON W. KAPKE
BY
John S. Rhoades
ATTORNEY

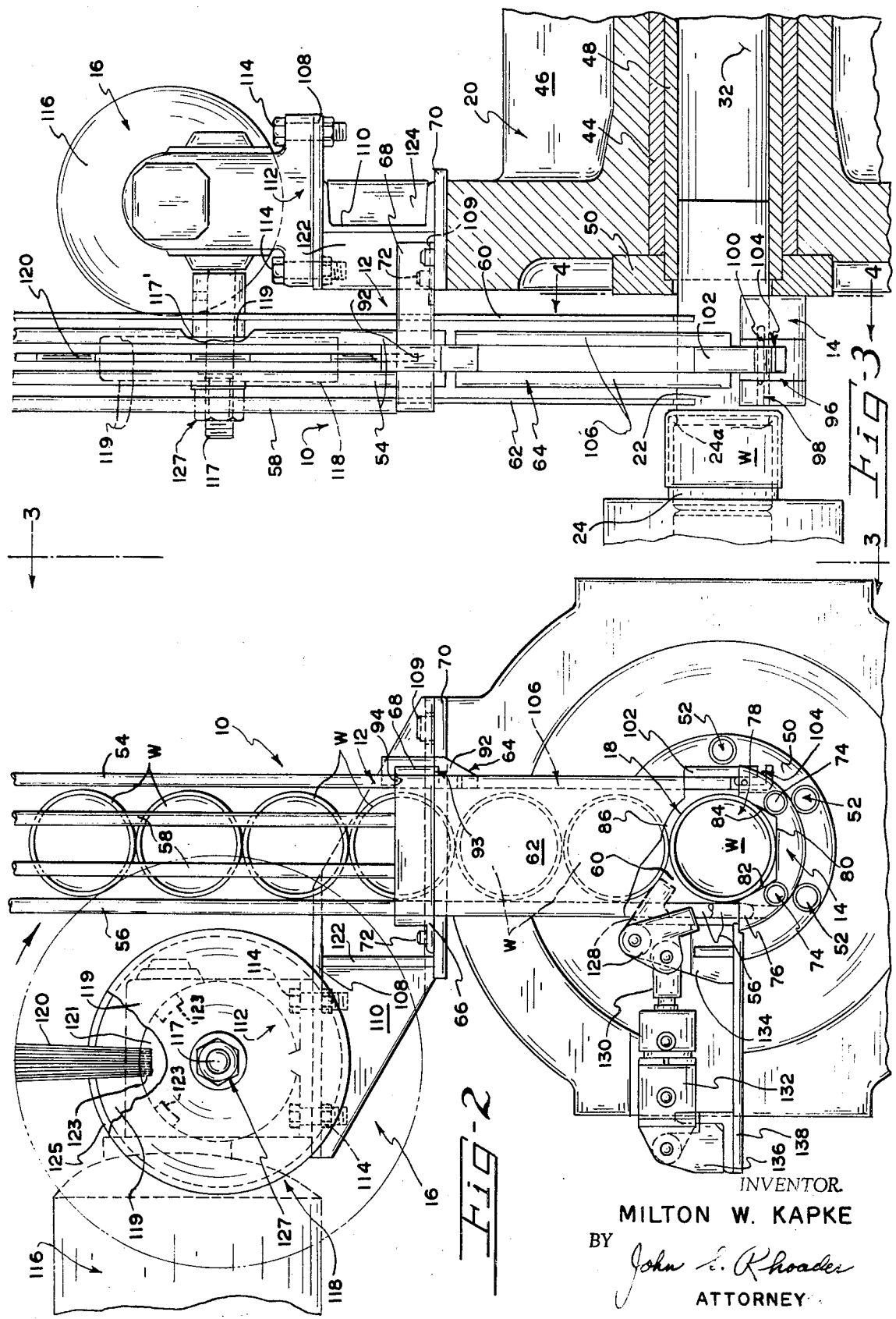

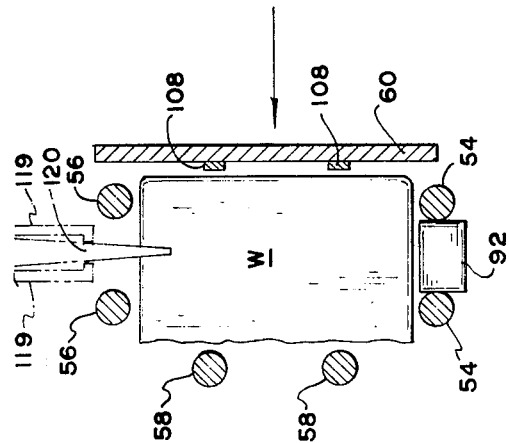
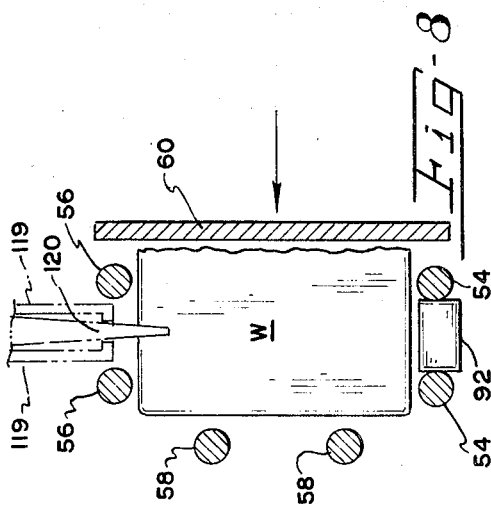
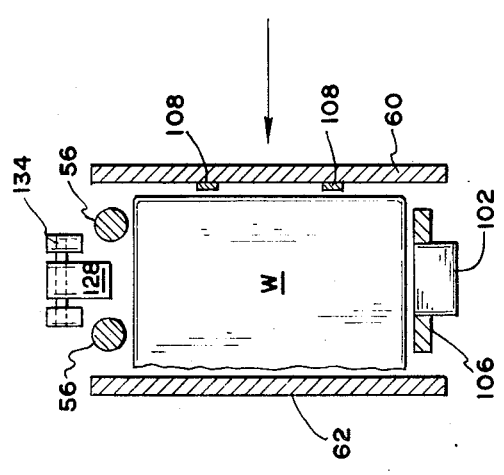
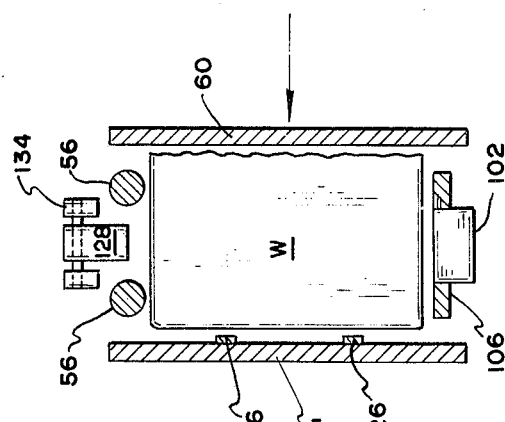
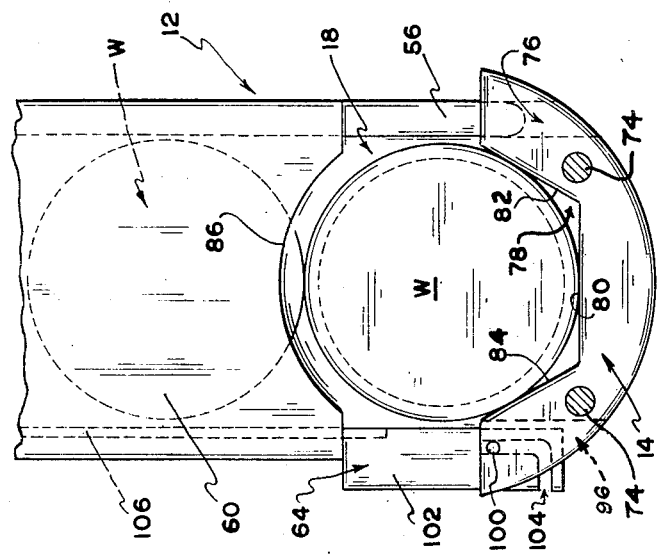

United States Patent Office 3,511,076
Patented May 12, 1970

3,511,076
FEEDING DEVICE
Milton W. Kapke, Golden, Colo., assignor, by mesne assignments, to Kaiser Aluminum & Chemical Corporation, Oakland, Calif., a corporation of California
Filed Dec. 18, 1967, Ser. No. 691,390
Int. Cl. B21j 13/10
U.S. Cl. 72—420                                    15 Claims

ABSTRACT OF THE DISCLOSURE

A device for use in feeding cup-shaped blanks and the like to a forming apparatus such as an apparatus comprised of a reciprocal ram aligned with and advanceable through one or more forming dies, wherein the device includes an improved resilient and movable wiper element for contacting and advancing a blank toward a position where it can be readily engaged by the ram and thereafter advanced by the ram through one or more forming dies.

BACKGROUND OF THE INVENTION

This invention relates to a feeding device which, among other things, can be used in the feeding of cup-shaped blanks to a container fabricating machine. More particularly, it relates to an improved feeding device for use in feeding cup-shaped blanks to a draw and iron container forming apparatus wherein a wiper feeder element operates in a unique fashion in conjunction with an arresting device as well as the forming ram of the apparatus to both feed successive blanks to and orient the blanks relative to the dies of the apparatus.

Various apparatus have been designed in the past for feeding successive cup-shaped workpieces to a draw and iron container fabricating press. Some of the principal deficiencies of these prior art feeder devices resided in the fact that the mechanical feeder elements used, such as rotatable turrets, conveyors, sliding feeder elements, etc., were subject to a certain amount of lost motion, which cut down on the operating speed of the feeder, and were subject to jamming, etc.

Further, the prior art feeder apparatus did not lend themselves to continuous visual inspection during feeding of successive cup-shaped workpieces. Since the final overall production rate of a given piece of equipment provided with such feeder devices is necessarily tied to the rate of feed of these feeders, it was difficult to operate these machines constantly at their optimum rated capacities. The wiper type feeder of the instant invention is such that it provides for a maximum workpiece feed rate while at the same time minimizing jamming and malfunctions in the feeding operation and providing optimum visual inspection of all feeder operating parts and associated elements during the feeding operation.

SUMMARY OF THE INVENTION

It is a primary purpose of the instant invention to provide an improved movable wiper-type feeder for use in a feed apparatus wherein a plurality of workpieces preferably disposed in stacked relation to each other are successively fed to a container forming apparatus, such as a draw and iron press that is normally provided with a reciprocating forming ram slidably disposed and aligned with one or more die means of the press. The overall feed apparatus generally comprises a partially open chute for receiving the workpieces and the movable wiper element is disposed adjacent this chute for wipingly engaging workpieces disposed in the chute so as to lightly press and urge the workpieces forward to a preselected position where they are aligned relative to both the forming ram and the die means of the press. The ram can then engage a properly positioned workpiece and pass it through one or more dies while momentarily closing off the feeder chute and arresting further workpiece feeding.

BRIEF DESCRIPTION OF THE DRAWINGS

In the accompanying drawings:
FIG. 1 is a side elevational view of a part of a forming apparatus provided with the feeder device of the instant invention, with parts broken away and with other parts being shown in dotted and solid lines;
FIG. 2 is an enlarged partly sectional and partly elevational view taken generally along line 2—2 of FIG. 1 with parts broken away and illustrates further details of the feeder device of the instant invention;
FIG. 3 is an end elevation of the apparatus shown in FIG. 2 when taken along line 3—3 thereof with parts added and other parts broken away;
FIG. 4 is an enlarged elevational view taken generally along line 4—4 of FIG. 3 and illustrates details of the bottom of the feed apparatus;
FIG. 5 is a cross sectional view taken along line 5—5 of FIG. 1 with certain parts in dotted lines and other parts removed;
FIG. 6 is a cross sectional view taken along line 6—6 of FIG. 1 with certain parts removed;
FIG. 7 is a side elevational view similar to FIG. 1 but with the cup-shaped workpieces being fed in a reverse fashion to that of FIG. 1;
FIG. 8 is a cross sectional view taken generally along line 8—8 of FIG. 7 and with certain parts shown in dotted lines and other parts removed; and
FIG. 9 is a cross sectional view with certain parts removed taken along line 9—9 of FIG. 7.

DETAILED DESCRIPTION

With further reference to the drawings and particularly FIGS. 1-6, a preferred embodiment of the wiper-type feeding device 10 of the instant invention generally comprises a one-piece chute or chute-like element 12, a stop and centering element 14 disposed across the exit end of the chute-like element 12 and a resilient and movable wiper element 16 disposed adjacent the chute-like element 12 between the ends thereof. Wiper 16 wipingly engages successive workpieces in the chute 12 in order to lightly press the endmost workpiece against the centering and stop element 14 and to hold it thereagainst until it is removed from stop 14 by the ram 22.

Although the device 10 is shown as being disposed in a vertical plane, it is to be understood that it could be disposed, where convenient or desirable, in a horizontal or slightly inclined plane, etc. The chute or chute-like element 12 is constructed so as to be partially open and provide optimum visual inspection of the workpieces W passing therethrough. The various front and back wall portions at the exit end of the chute-like element 12 are partially cut away to define an overall transverse opening 18 adjacent the stop block 14 all as indicated particularly in FIGS. 3–4. A sidewall portion of element 12 is advantageously hingedly and releasably connected thereto for the purpose of providing quick access to the interior of the chute 12 for servicing purposes.

The feeding device 10 of the instant invention is preferably attached to a container draw and iron forming apparatus 20 provided with a reciprocating forming ram 22 and a series of spaced and associated draw and iron die elements 24, 26 and 28 arranged within a tool pack 30. This draw and iron apparatus 20 can, for example, be of the type shown in Langewis Pat. 3,314,274, issued Apr. 18, 1967. The movable wiper element which can take the form of a rotating brush partially fits within the chute 12 so as to wipingly engage the workpieces therein and urge the endmost workpiece against the centering and stop element 14 until it is ultimately removed therefrom by the advancing ram 22, as will be more fully described hereinafter, by a fluid actuator 34 of the type shown in the above patent to Langewis. This actuator includes a crank-operated driving piston 36 (only part of which is shown) for actuating the fluid 38 confined within a chamber for the actuator 34 and disposed in direct communication with the piston 40 attached to the inner end of the piston rod 32 with fluid 38 acting as a fluid coupling between the pistons 36 and 40.

The ram 22 is disposed for slidable movement within the bore 42 defined by a cylindrical sleeve 44 disposed in the barrel 46 of the apparatus 20. The forming end of the ram 22 can be slidably disposed within a bearing and guide sleeve 48 affixed in a conventional manner to the forward end of the sleeve 44. The forward end of the sleeve 48 extending beyond the forward flanged end of the barrel 46 of the apparatus 20, and best illustrated in FIG. 3, is closed off by an apertured closure member 50 attached to the outer face of the forward flanged end of the barrel 46 by the usual cap screw assemblies generally indicated at 52 in FIG. 2.

As indicated in FIGS. 1 and 3 and in the aforesaid Pat. 3,314,274, the die means 24 can be advantageously made up of appropriate draw and ironing dies such as a reverse redraw die 24 and a series of ironing dies 26 and 28 together with an appropriate stripper mechanism S disposed adjacent the last ironing die 28 in the overall die means or tool pack 30.

The chute 12, as illustrated in FIGS. 2–3, can be comprised of several pairs of parallel spaced rods 54, 56 and 58, plate elements 60 and 62 and spaced angle elements 66 and 68 for anchoring the aforesaid rods 54, 56 and 58 and plate elements 60 and 62 to the flanged end of the barrel 46 of the apparatus 20 adjacent the entry die 24 of the tool pack 30. The angle members 66 and 68 extend transversely of the length of the chute and are anchored at their inner or right ends, as viewed in FIG. 3, to the base plate 70 by a series of cap screws 72 in a conventional manner. The plate 70 is attached to the flattened upper portion of the flanged end of the barrel 46 of the apparatus 20.

In order to form the back wall of the chute 12, the plate 60 can be made to extend the full length of the chute 12, and its longitudinal edges intermediate the ends thereof are connected to the vertical leg sections of the angle members 66 and 68. The horizontal leg section of angle member 68 is cut away adjacent its outer end to form a pocket within which rods 54 and plate 60 fit. This cut away section of the angle member 68 also eliminates any interference of angle member 68 with the normal advancement of the various workpieces W within the chute toward the discharge end thereof.

The parallel spaced rods 58 and plate 62 connected to the angle members 66 and 68 form the front wall of the chute 12. The longitudinal edges at the upper end of plate 62 face the inside surfaces of the vertical leg sections of the angle members 66 and 68 at the outer ends thereof, all as shown in FIG. 3. Rods 58 are weldably affixed at their lower ends to the top edge of the plate element 62 in parallel spaced relation to each other as well as to the longitudinal edges of the plate element 62. As indicated in FIG. 3 by affixing the lower ends of the rods 58 to the top of plate 62 in forming the front wall of the chute, the inwardly facing surface portions of the rods 58 are brought into planar alignment with the inner face of plate 62 whereby the overall front wall of the chute has a smooth interior surface providing a full uninhibited free fall or travel of the workpieces stacked in the chute.

Although not shown in the drawings, it is to be understood that the back wall plate 60 can be adjustably connected to the angle members 66 and 68 so as to enable adjustment of the plate element 60 laterally toward and away from the front wall plate element 62 and spaced rods 58, whereby the chute 12 can be adjusted to accommodate workpieces of varying dimensions.

The lower or discharge end of the chute 12 is appropriately connected by the lower ends of its spaced rods 56 to the centering and stop element 14 in such a fashion that the lower end of the chute 12 is properly aligned with stop element 14. Spaced rods 56 form one sidewall of the chute 12 and are affixed intermediate their ends to the inside face of the vertical leg section of the angle member 66 so as to be disposed parallel to each other as well as to the front and back walls of the chute 12. Stop element 14 is also affixed to the outwardly facing surface of the apertured closure member 50 by conventional bolts 74. The left-hand end of the top of element 14 as viewed in FIG. 2 includes a pair of spaced and circular openings 76. Only one of these openings is indicated by dotted lines in FIGS. 2 and 4. Openings 76 are aligned with the lower ends of the pair of rods 56 and are adapted to slidingly engage these lower ends of rods 56. By having the spaced rods 56 which form one sidewall of the chute 12 slidingly engage stop element 14 in the fashion noted, the discharge end of the chute 12 is assured of being properly aligned with the centering and stop element 14.

The other sidewall of the chute 12 is comprised of a series of upper rods 54 and a hinged lower sidewall section generally indicated at 64. Rods 54 are held in parallel spaced relation to each other and to the front and back walls of the chute by having their lower ends welded to the inside face of the vertical leg section of the angle member 68 as depicted in FIGS. 2–3. The hinged lower sidewall section 64 is comprised of a pair of elongated bars 106 and upper and lower block elements 92 and 102 welded to various surface portions of the parallel spaced bars 106 at the upper and lower ends thereof respectively. The upper block member 92 constitutes a latch that releasably engages the top edge of the vertical leg section of the angle member 68. The block member 92 is cut away on its inner side to define an inwardly facing channel-shaped recess 93, for receiving the angle member 68 whereby the latch 92 can freely overlap and engage a portion of the angle member 68, all as illustrated in FIGS. 2–3.

To prevent inadvertent or accidental disengagement of the latch 92 from the top edge of the vertical leg section of the angle member 68, a downwardly projecting protrusion or lip 94 as indicated in FIG. 2 is provided at the top of the latch 92. By making the width of block member 92 slightly smaller than the spacing between the parallel spaced rods 54, block member 92 can be freely fitted therebetween so as to facilitate its latching connection to and release from the angle member 68 as aforedescribed. Lower block element 102 is hingedly connected to the centering and stop element 14 and to this end it includes an angularly shaped groove 104 which cooperates with a groove 96 in stop element 14 for receiving a hinge pin 100. Pin 100 bridges grooves 96 and 104 and the ends of the pin are loosely anchored in the aligned openings 98 that extend through the body portions of the centering and stop element 14 adjacent the sides of the groove 96.

After initial insertion of pin 100 in openings 98, the block element 102 is fitted over pin 100 by sliding the grooved portion of block 102 over the intermediate portion of the pin 100. The interior leg section of the groove 104 is of sufficient length to allow the sidewall portion 64 to be lifted relative to the chute 12 whereby the latch 92 can be easily connected to or disconnected from the angle member 68. After any disconnection, the block 102 remains pivotally connected to the pin 100 whereby the sidewall portion 64 can be pivoted to an out-of-the-way position by a clockwise rotation thereof, as viewed in FIG. 2, for the purpose of gaining access to the interior of the chute for servicing purposes. By virtue of groove 104 being open-ended, the sidewall portion 64, after unlatching the block 92 thereof from angle member 68, can be completely removed from the chute 12 instead of being pivoted about the pin 100 as aforedescribed. The partially enclosed chute 12, made up of plate elements 60 and 62 and three pairs of spaced rods 54, 56 and 58, has smooth interior surfaces allowing full free travel or fall of the stacked workpieces therethrough and optimum visual inspection by the operator of the interior of the chute 12 at all times.

The top of the stop and centering element 14 is partially cut away to form a blank receiving groove 78 defined by a bottom surface 80 and inclined surfaces 82 and 84 that project upwardly and outwardly from the outer ends of the bottom surface 80. The bottom edges of the plates 60 and 62 that form the back and front walls of the chute 12 are correspondingly cut away to form corresponding arcuate edges 86 which combine with the groove 78 of element 14, rods 56 and sidewall elements 64 to form a workpiece and ram receiving opening 18 that extends transversely through the chute at the discharge end thereof.

As indicated particularly in FIGS. 5–6, the depth and diametrical size of the cup-shaped workpiece W is such that it is somewhat smaller than the internal dimensions of the chute 12. Thus, the workpieces W deposited at the outer or entry end of the chute of the device can freely travel from the top to the bottom or exit end of the chute. In order to minimize frictional engagement between the workpieces W and the inside surfaces of the chute 12 and assure the free movement of the workpieces through the chute, parallel spaced ribs 108 made of an appropriate material can be provided on the inside surface of the back plate 60. The diametrical extent of the transverse opening 18 at the lower end of the chute 12 is somewhat larger than the diametrical size of the workpieces W so as to assure free transfer of the bottommost workpiece at any given time through the opening 18 and onto the nose portion 24a of a reverse redraw die 24 upon advancement of the forming ram 22 along with the workpiece through opening 18 and the tool pack 30.

In order to facilitate depositing of the workpieces from a hopper or other suitable means, not shown, into the entry end of the chute 12, the upper ends of the rods 54, 56 and 58 along with back plate 60 of the chute are advantageously beveled outwardly in the manner illustrated in FIG. 1. If desired, reinforcing means (not shown) can be provided for the upper end of the chute 12 such as a strap element tightly wrapped in a suitable fashion about the outside of the upper ends of the spaced rods 54, 56 and 58 and the back plate 60.

In order to assure proper movement of the various workpieces W toward the exit end of the chute 12 and thereby insure proper feeding of successive workpieces W into alignment with the forward end of a ram 22, a movable wiper element 16 is advantageously disposed intermediate the entry and exit ends of the device. The wiper 16 is arranged so as to partially project into the interior of the chute 12 for wipingly engaging surface portions of one or more workpieces stacked within or passing through the chute. The movable wiper element 16 which can advantageously take the form of a rotatable brush provided with nylon bristles is mounted on an I-beam comprised of a channel-shaped member 110 and plates 70 and 108 connected thereto. The plate 70, as aforedescribed, anchors the angle members 66 and 68 of the chute 12 in place and is also affixed to the flattened surface portion at the upper part of the flanged end of the barrel 46 by cap screw assemblies 109 only one of which is indicated in FIGS. 2–3. Plates 70 and 108 are affixed to the flanged portions of the channel-shaped member 110 in such a fashion as to be longitudinally offset relative to each other and because of the offsetness of plates 70 and 108, the ends of the channel-shaped member 110 can be beveled, as indicated in FIG. 2. To further strengthen the I-beam, suitable reinforcing elements 122 and 124 are affixed between the plates 70 and 108 on opposite sides of the channel-shaped member 110.

As indicated above, the movable wiper element 16 is preferably a rotary brush 118 driven in a clockwise direction, as viewed in FIG. 2, by an electric motor 116 operatively connected to the brush 118 by an output shaft 117 of a suitable worm gear transmission enclosed within a housing 112. The housing 112 is adjustably affixed to the top of the plate 108 of the I-beam by a series of bolt-nut assemblies 114 passing through aligned and slotted openings in the housing 112 and plate 108 in a well-known fashion. The electric motor 116 is connected to the gear transmission housing 112 at right angles to the output shaft 117 so as to facilitate the worm gear connection within the housing 112.

The rotary brush 118 is comprised of a pair of apertured disc plates 119, and an apertured hub 121 of smaller diameter disposed or sandwiched therebetween and to which plates 119 are attached. The hub 121 includes a plurality of inwardly directed and appropriately spaced radial grooves, a few of which are indicated by dotted lines 123 in FIG. 2. Each groove 123 is adapted to receive a series of fibers or bristles 120 of resilient nylon or some other suitable wear resistant material. The inner ends of the fibers or bristles 120 can be freely inserted within their respective groove 123 and firmly anchored therein by a suitable adhesive or wire means or the like. It is to be understood that all of the fibers 120, in any individual groove 123, combine to form a loose and expanded annular tuft or cluster of fibers 120 and they are normally just long enough to project a short distance into the chute 12. In a preferred embodiment of the invention these clusters of fibers are spaced from one another. In assembling the brush 118 to the threaded end of the shaft 117, the apertured hub 121 is interposed between the apertured discs 119 and key-connected to the shaft 117 in the usual fashion.

If desired, a nut and washer assembly 127 can be used to fasten both discs 119 and hub 121 by drawing them together into a tight brush assembly, such that the inner disc 119 abuttingly engages the shoulder 117' on the enlarged end of the shaft, as illustrated in FIG. 3. The entire brush assembly 118 can then be removably anchored to the threaded and exposed end of shaft 117. The outer periphery of the discs 119 are flanged, as indicated at 125 in FIG. 2, to facilitate compaction of the fibers 120 upon assembling the brush 118 to the shaft 117. This compaction of the fibers in the groups of fibers 120 assures adequate and continuously uniform wiping engagement by the fibers 120, during the rotation of the brush 118, with surface portions of one or more workpieces W located within the chute 12 as illustrated in FIG. 2.

It is to be understood of course that during assembly of brush 118 to the shaft 117, and prior to tightening of bolt 127, that the brush 118 is first lined up with the chute 12 so that the groups of fibers 120 of the brush 118 are inserted a short but sufficient distance between the spaced rods 56 and into the chute 12. Insertion of the brush 118 within chute 12 in this manner assures the necessary wiping of one or more workpieces stacked within the chute 12 during rotation of the brush 118 so that the fibers 120 of the brush 118 can properly urge the workpieces individually and collectively toward the discharge end of the chute 12.

The linear speed of the tufts of fibers 120 at the point of wiping engagement with one or more workpieces W in the chute 12 is such as to continuously urge the workpieces towards the opening 18 of the discharge end of the chute without inducing chatter of the workpieces and yet at the same time lightly press and hold the endmost workpiece firmly against the block 14 and in alignment with the forward end of the advancing ram 22 as it emerges from the housing 20. As noted above, the fibers 120 can be composed of any suitable material such as a suitable grade of nylon so long as the material used has the proper stiffness and resiliency to be able to wipingly engage the workpieces W without adversely affecting the surface finish thereof or inproperly collapsing under the pressure required to perform the work involved.

The opposed sidewalls of the chute 12 made up of the rods 56 and the removable sidewall portion 64, the centering block 14, the next-to-the-bottommost workpiece W of the stacked workpieces and brush 118 all cooperate together with each other in effecting a seating and holding of the bottommost workpiece W against the spaced beveled portions 82 and 84 of the block 14. When this seating of each bottommost workpiece occurs, the workpiece automatically centers itself relative to the forming end of the ram 22.

As indicated particularly in FIG. 3, the nose portion of the reverse redraw die 24 is disposed immediately adjacent to the opening 18 in such fashion that it can be adequately cleared by the open end of the bottommost workpiece W as the workpiece W drops into place on block 14. When the ram 22 advances through opening 18, the forming end thereof abuttingly engages the bottom of the bottommost workpiece W, removes it from the centering element 14 and then passes it through the tool pack 30 in a continuous uninterrupted fashion. At the same time, the trailing portions of ram 22 and piston rod 32 act to close off the bottom of the chute 12 and prevent further discharge of the next workpiece onto the centering element 14 until such time as the ram 22 is retracted into the sleeve 48 on its return stroke.

As the ram retracts into the sleeve 48 and effects an opening of the discharge end of the chute 12, the next adjacent workpiece W becomes automatically deposited upon the ledge 14 and is readied for engagement with the ram on its next forward stroke due to the pressure being continuously applied by brush 118 through the column of workpieces to the lowermost workpiece. When it is realized that the ram 22 is stroking at a speed of from 120 to 140 strokes a minute and a workpiece W has to be deposited quickly and accurately on centering element 14 in a fraction of a second, the advantageous use of a movable wiping element to lightly press and seat the workpiece on the element 14 will be readily appreciated. Because of the rapid stroking of the ram 22, the rate of feed of the mechanism for supplying the entry end of the chute such as a hopper should also be fast enough to keep the chute constantly filled in order to meet the demands of the fast stroking ram. Furthermore, the linear speed of the rotary brush element 118 at its point of peripheral wiping engagement with one or more workpieces W within the chute should be sufficient to urge a workpiece against the seat of the element 14 without jamming or otherwise interfering with the pick-up of the endmost workpiece by the advancing ram.

Another advantageous embodiment of the invention is illustrated in the feeder 10' of FIGS. 7-9. In this instance, longitudinally spaced ribs 126 are formed on the lower front plate 62' of the chute 12' so as to minimize frictional engagement of the workpieces W therewith. Tool pack 30' in this instance may include an ordinary straight redraw die 24' at the entry end thereof in lieu of the reverse redraw die 24 illustrated at the entry end of the tool pack 30 in FIGS. 1-4.

In this instance, because of use of a straight redraw die in tool pack 30', the open end of the bottommost workpiece W in the device 10' is slid directly over the forming end of the ram 22 upon the advancement thereof until the bottom of the workpiece W abuttingly engages the forward end of the ram 22. The straight redraw die 24' at the entrance end of the tool pack 30' is closely spaced from the lower end of the device 10' and thus prevents misalignment of the bottommost workpiece during transfer onto the ram 22 upon the advancement thereof. As with the aforedescribed device 10, the next-to-the-bottommost workpiece W is temporarily arrested in its advancement toward the bottom end of the chute 12' by slidably engaging the trailing portion of the ram 22 and piston rod 32 until after full retraction of the ram 22 on its backward stroke.

In those instances when ram 22 is idling with respect to either feeder 10 or 10', a workpiece arresting device such as finger 128 pivotally connected to a bifurcated mounting bracket 134 can be used to stop further workpiece feeding within the chute 12 or 12'. If desired, finger 128 can be pivotally connected to the exposed end of a piston rod 130 that forms part of a fluid actuator 132 that is pivotally connected to a mounting bracket 136. Brackets 134 and 136 are both fixed in spaced relation to a common base plate 138 that it attached in a suitable manner to the front face of the barrel 46 of the apparatus 20. Positioning of the arresting finger 128 on the base plate 138 is effected in such fashion that the finger 128 in its non-operative position is disposed between the spaced rods 56 of either feeder 10 or 10' all as shown in FIGS. 6 and 9. Upon actuation of the actuator 132, the arresting finger 128 is pivoted to the upward position, shown by dotted lines in FIG. 2, so as to engage the next-to-the-bottom workpiece W within the chute 12 or 12' whereby the ram 22 can idly stroke without disturbing the stacked workpieces remaining therein or the rotation of brush 118 if it is allowed to rotate at this time. It is to be understood that the fluid actuator 132 can be interconnected to an electrical control circuit (not shown) provided with an interlock that prevents actuation of the actuator 132 until after the forward end of the ram 22 is extended beyond the discharge end of the chute and into the tool pack 30 or 30', as the case may be, so as to prevent improper actuation of the finger 128 and arrestment of the next-to-the-bottommost workpiece W within the chute 12 or 12'.

It is also within the contemplation of this invention that, although the chute 12 or 12' is illustrated as having one straight path of travel between its entry and discharge ends, the chute could be somewhat curved. Instead of using a rotary brush 118 of the type shown for the wiper element, the wiper element could also take the form of a brush provided with continuous lines of fibers or bristles, a driven endless belt or a series of flexible cleats appropriately arranged about a driven endless belt with the cleats being disposed adjacent the chute for projecting therein to wipingly engage one or more workpieces W deposited within the chute.

Although preferred embodiments of the instant invention have been disclosed and described, it will be apparent that various changes and modifications may be made therein without departing from the spirit and scope thereof as defined by the appended claims.

What is claimed is:

1. A feeder device for use with a press apparatus of the type described with said press apparatus being provided with a die means and a reciprocating forming ram aligned with and advanceable through said die means, said feeder device being adapted to feed workpieces in a successive fashion to said press apparatus, and comprising a chute-like means for receiving the workpieces at one end thereof and for discharging the workpieces at another end thereof, the discharge end of said chute-like means being disposed adjacent said die means of the press apparatus, a workpiece receiving means located adjacent said die means and the discharge end of the chute-like means for engaging a workpiece and for orienting and centering the workpiece relative to said die means, a resilient and movable wiping element disposed adjacent the said chute-like means and engageable with another workpiece so as to lightly press a workpiece into contact with and against said workpiece receiving means and to hold said last-mentioned workpiece against said workpiece receiving means until the last-mentioned workpiece is removed therefrom by said ram upon the forward advancement thereof past said workpiece receiving means.

2. The combination as set forth in claim 1 in which said workpiece receiving means is provided with a workpiece seating means.

3. The combination as set forth in claim 1 in which said chute-like means is comprised of spaced rods.

4. The combination as set forth in claim 1 in which a portion of said chute-like means is provided with a hingedly connected sidewall means.

5. The combination as set forth in claim 1 in which said resilient and movable wiping element comprises a rotary brush.

6. The combination as set forth in claim 1 in which said die means includes a reverse redraw die.

7. The combination as set forth in claim 1 in which said die means includes a straight redraw die.

8. The combination as set forth in claim 1 including means for temporarily arresting the feeding of workpieces in said chute-like means towards said workpiece receiving means.

9. The combination as set forth in claim 1 including means on said chute-like means which cooperate with the ram upon the advancement thereof to effect closure of the discharge end of said chute-like means and temporarily block advancement of the workpieces in said chute-like means towards the discharge end thereof.

10. The combination as set forth in claim 5 in which said rotary brush is comprised of groups of bristles, with the bristles in each group being closely compacted together.

11. The combination as set forth in claim 10 in which said bristles are made of nylon.

12. In combination with a press apparatus provided with a die means and a reciprocating forming ram aligned with and advanceable through said die means, a device for feeding workpieces in another successive fashion to said press apparatus, said feeding device comprising a chute-like means for receiving the workpieces at one end and for discharging the workpieces at the other end and a combination workpiece stop and centering element located adjacent said die means and the discharge end of said chute-like means for receiving and orienting a workpiece relative to said die means, the improvement comprising a resilient and movable wiping element disposed adjacent said chute-like means and engageable with a workpiece so as to lightly press a workpiece against said stop and centering element and hold said last-mentioned workpiece against said stop and centering element until the said last-mentioned workpiece is removed therefrom by said ram upon the forward advancement thereof past said stop and centering element.

13. The combination as set forth in claim 12 wherein said wiping element comprises a rotatable brush means.

14. A feeder device for use with a workpiece treating apparatus, said feeder device being adapted to feed workpieces in a successive fashion to said treating apparatus and comprising a chute-like means for receiving the workpieces at one end thereof and for discharging the workpieces at another end thereof, the discharge end of said chute-like means being disposed adjacent said workpiece treating apparatus, a fixed workpiece receiving means located adjacent said workpiece treating apparatus and the discharge end of the chute-like means for engaging a workpiece and for orienting and centering the workpiece relative to said workpiece treating apparatus, a resilient and movable wiping element disposed adjacent the said chute-like means and engageable with a workpiece so as to lightly press another workpiece into contact with and against said fixed workpiece receiving means and to hold said last-mentioned workpiece against said fixed workpiece receiving means until the last-mentioned workpiece is removed therefrom by means separate from said wiping element.

15. A feeder device as set forth in claim 14 in which said resilient and movable wiping element comprises a rotary brush.

References Cited

UNITED STATES PATENTS 2,842,913    7/1958    Marindin _____ 53—67
2,695,125    11/1954    Bowen _____ 53—299

RICHARD J. HERBST, Primary Examiner

M. J. KEENAN, Assistant Examiner